July 31, 1956  R. W. HYDE  2,756,775
FAUCET CONSTRUCTION
Filed March 5, 1952  2 Sheets-Sheet 1
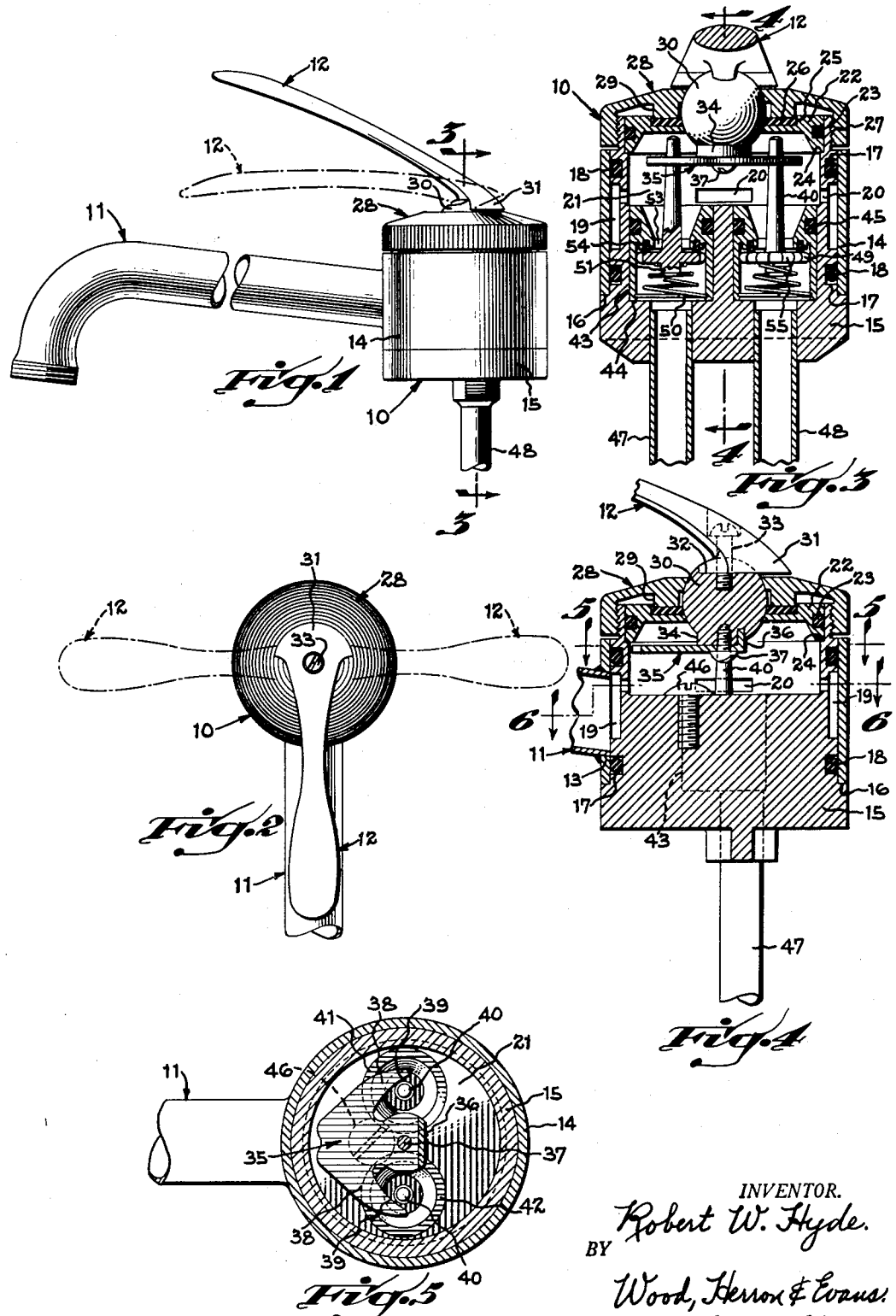
INVENTOR.
Robert W. Hyde.
BY Wood, Herron & Evans.
ATTORNEYS.

July 31, 1956 R. W. HYDE 2,756,775
FAUCET CONSTRUCTION
Filed March 5, 1952 2 Sheets-Sheet 2

INVENTOR.
Robert W. Hyde.
BY
Wood, Herron & Evans.
ATTORNEYS.

United States Patent Office 2,756,775
Patented July 31, 1956

2,756,775

FAUCET CONSTRUCTION

Robert W. Hyde, Cincinnati, Ohio, assignor to The Schaible Company, Cincinnati, Ohio, a corporation of Ohio Application March 5, 1952, Serial No. 274,965

3 Claims. (Cl. 137—636)

This invention is directed to an improved water faucet of the type having a single handle or lever for controlling the flow of both hot and cold water.

In the preferred embodiment of the invention, the faucet handle is arranged so that by swinging it in one direction, horizontally from a central or off position, the flow of cold water only is controlled, and by swinging it horizontally in the opposite direction from the off position, the flow of hot water only is controlled. Upon depressing the handle straight down from the centered position, both hot and cold water flow in equal proportions. However, by both depressing and swinging the lever either left or right from the central position all proportions of hot and cold water can be obtained within the range of the respective temperatures of the water in the hot and cold supply lines. The volume of water caused to flow is dependent generally upon how far the lever is moved from the central or off position. Thus, the single lever controls both the temperature and the volume of water issuing from the spout.

One of the objectives of the invention is to provide a faucet of the type described in which the control handle can be operated with a very light touch, that is, moved from position to position with little effort, but despite this freedom of movement, remain in a set position without being held. In other words, in the present construction the handle does not return to the off position when released, nor does it tend to creep from a position in which it has been set like the handles of past single control faucets have tended to do. This objective is fulfilled by a unique arrangement of valves and valve operating elements which transmit little of the static or dynamic force of the water acting upon the valves to the operating handle. Consequently, little frictional force between the valves and handle is required to overcome the tendency for the water force to affect movement of the handle. In the preferred embodiment, the small frictional force required is obtained at the packing gland used to seal the handle assembly where it enters the faucet housing.

Another object of the invention is to provide a faucet of the type described which will give long, trouble-free service.

A further object of the invention is to provide a faucet of the type described in which the hot and cold water, when the two are being discharged at once, are thoroughly mixed before issuing from the faucet.

Another object of the invention is to provide a single control faucet which is smooth in operation over the entire volume range from a thin stream to full flow.

Other objects and advantages of the invention will be readily apparent to those skilled in the art from the following detailed description of the drawings in which:

Figure 1 is a side elevational view of a single control faucet construction embodying the principles of this invention.

Figure 2 is a top plan view of the faucet construction shown in Figure 1.

Figure 3 is a cross sectional view taken on line 3—3 of Figure 1.

Figure 4 is a cross sectional view taken on the line 4—4 in Figure 3.

Figure 5 is a cross sectional view taken on the line 5—5 of Figure 4.

Figure 6:
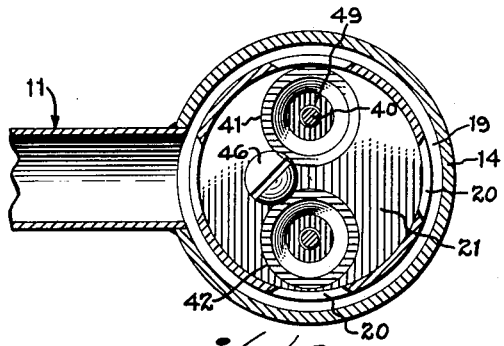
Figure 6 is a cross sectional view taken on the line 6—6 of Figure 4.

In general the improved faucet includes a housing 10, a spout 11 and a control handle 12. In the instance shown, the faucet is of the swing spout type with the spout threaded externally at its outer end to accommodate an anti-splash device. Preferably, handle 12 extends forwardly from the faucet housing at the top thereof, being arranged to swing horizontally through 180 degrees and, in the embodiment shown, depressed through approximately 30 degrees, the preferred limits of swing being indicated by the dot dash lines in Figures 1 and 2. The inner end of spout 11 is seated in an aperture 13 formed in the wall of a cylindrical sleeve 14. The spout may be brazed, welded or otherwise secured to the cylinder. The sleeve 14 surrounds body portion 15 of the faucet housing and rests upon an annular shoulder 16 formed by turning the outside of the faucet body down an amount equal to the thickness of the wall of the sleeve, so that the outside of the faucet is flush as shown in Figure 1.

Adjacent the respective upper and lower ends of sleeve 14, a pair of grooves 17—17 are provided in the periphery of the faucet body. A neoprene O ring 18 is seated in each of the grooves 17, the two rings serving to seal the sleeve with respect to the faucet body. Intermediate the two grooves 17, a considerably wider groove is formed in the outer periphery of the faucet body to provide a passageway 19 which encircles the faucet body and opens into the spout as shown in Figure 4. Water enters passageway 19 through ports 20 passing through the faucet body from the hollow interior thereof which constitutes a mixing chamber 21.

The upper end of the mixing chamber is enclosed by a top sealing ring 22. Preferably the sealing ring is formed of brass and has a peripheral groove cut in it to seat a neoprene O ring 23. The sealing ring is seated in the upper end of the faucet body upon a shoulder 24 formed by enlarging the diameter of the mixing chamber. Preferably, the underside of the sealing ring is concave to provide clearance for valve stems to be described later. The upper surface of the sealing ring includes an annular groove 25 which seats a resilient washer 26, formed of rubber, neoprene or the like. Above sleeve 14 the upper marginal edge of the faucet body is threaded externally as at 27 to accommodate a cap, indicated generally at 28. The underside of cap 28 is configurated to provide a depending annular boss 29 which engages the upper surface of the resilient washer 26 and serves to hold it in seated engagement with the annular groove 25 in the top sealing ring 22 when the cap is tightened onto the faucet body. Centrally thereof, the cap 28, washer 26, and top sealing ring 22 are configurated to accommodate a ball pivot 30. The center of the ball pivot is disposed between the cap and the sealing ring with the contacting edges of the cap, washer, and sealing ring configurated to conform to the surface of the ball pivot. Thus, it will be seen that the ball pivot is free to be turned within the horizontal and vertical limits required by the handle while a water tight seal is maintained around it.

The design of handle 12 and the manner in which it is secured to the top of the ball pivot is not particularly critical, however, it is suggested that the handle include a rearwardly extended ledge portion, such as the one shown at 31, so that upward movement of the handle is limited by engagement of the ledge with the upper surface of the cap in the area around the ball pivot. In addition, it is suggested that the upper portion of the ball pivot be cut out to provide a seat for the handle with appropriate shoulders such as the one shown at 32, being provided to key the handle to the ball. Also the handle may be fastened to the ball pivot by means of a bolt such as the one shown at 33 which has its head countersunk, extends through a bore in the handle, and threads into the ball pivot. It will be obvious that the handle may extend straight up or in another direction than the one shown without affecting the essential operating characteristics of the faucet. It is believed, however, that extending the handle forwardly at the angle shown places it where it can be operated most conveniently.

The lower portion of the ball pivot depends into the mixing chamber 21 and has a boss 34 formed upon it to provide a flat seat for a valve actuator indicated generally at 35. The valve actuator is disposed generally horizontally when the handle is in off or raised position as shown in Figures 2–5. The actuator may be plate-like in form with a tang 36 turned up from its rear edge and seated in a groove cut in the under surface of ball pivot 30 to key it to the ball pivot. Just forwardly of tang 36 an aperture is provided in the actuator plate to receive a bolt 37 which threads up into the ball pivot to lock the actuator plate thereto. The preferred configuration for the valve actuator plate is shown in Figure 5. Forwardly of tang 36, the two sides of the actuator plate are arcuate, being formed on a radius centered at the axis of bolt 37. This portion of the actuator is seated upon boss 34 and may complement its shape. Forwardly of the boss a pair of wings 38—38 extend outwardly to the sides of the plate. The rear edges of these wings are formed upon a radius which is eccentrically centered with respect to the axis of bolt 37, the center being to the right or rear of bolt 37 as shown in Figure 5.

The rear edges just described comprise cam edges 39—39 which are adapted to contact the respective stems 40—40 of a pair of valves, 41 for hot water and 42 for cold water, which control the flow of water into the mixing chamber.

The valves may be identical. The preferred type is disclosed in detail in my co-pending application filed March 6, 1952, Serial No. 275,199, now abandoned. Generally, each valve comprises a cylindrical valve body 43 which is seated within a bore 44 formed in the floor of the mixing chamber 21. Each is sealed with respect to the bore by means of an O ring 45 which is seated within a groove extending around the valve body near the upper end thereof. The respective valves 41 and 42 are disposed upon opposite sides of the vertical axis of the faucet body as defined by the axis of bolt 37 when the faucet is in off position. The valves are locked in their respective bores by means of a large headed bolt 46 which is threaded into the floor of the mixing chamber between the two valves where its head overhangs both of their respective upper edges. The lower portion of the valve body is bored concentrically with each of the bores seating the valves to accommodate respective hot and cold water supply lines 47 and 48. These supply lines may be brazed or soldered to the faucet body after being inserted in the respective bores.

Generally speaking, the valves are arranged so that they shut off as a result of the pressure within the water lines. The lower portion of each valve body is hollowed out to accommodate a valve disc 49 and a conical coil spring 50. The valve disc 49 and stem 40 may be made in one piece with the stem being centered and extending at right angles from its upper face. The underside of the disc has a stud 51 depending from it which is also centered and aligned with stem 40. The conical coil spring 50 has its smallest coil at the top, where it fits around stud 51 and rests against the underside of disc 49. The largest coil of the spring at the bottom seats within a groove 52 cut into the wall of the hollowed out portion of the valve body adjacent the lower end thereof. The coil spring thus serves to urge the valve upwardly and in addition serves to center the valve with respect to the vertical axis of the valve body.

Figure 7:
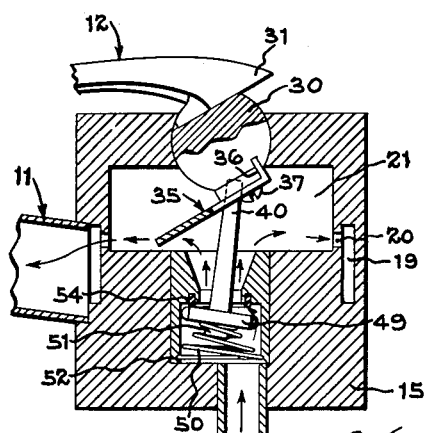
Figure 7 is a diagrammatic cross sectional view similar to Figure 4 showing one of the valves in open position.

Just above center, the valve body is configurated to provide a circular port 53 through which valve stem 40 extends. Above the port the valve body flares outwardly and upwardly to a narrow upper rim. Concentric with port 53 a groove is cut up into the valve body and a ring 54 of valve seat material seated therein. The ring 54 may be formed of neoprene, nylon, rubber, or other semi-resilient material. The outer periphery or marginal edge of the valve disc 49 is toothed, the teeth indicated at 55, starting outwardly of ring 54 when the valve disc is seated. This relationship is shown in Figure 3. As shown in the diagrammatic view, Figure 7, the valve is opened by tipping valve stem 40 to move disc 49 off its seat against ring 54. In other words, the valve will open whenever the stem is tipped off the vertical axis of the valve body.

Figure 8:
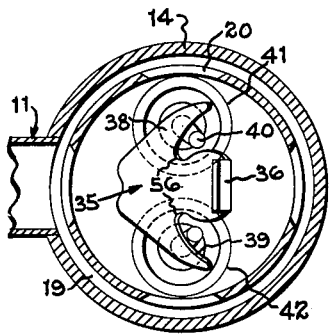
Figure 8 is a diagrammatic cross sectional view similar to Figure 5 showing both valves opened an equal amount.
Figure 9:
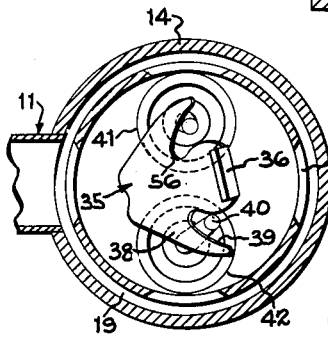
Figure 9 is a view similar to Figure 8 showing one of the valves opened more than the other.
Figure 10:
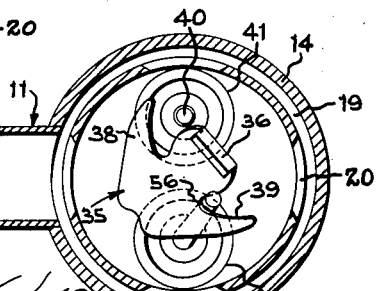
Figure 10 is similar to Figures 8 and 9 and shows one only of the valves open.

Referring now to Figure 5, which shows valve actuator 35 in its off position, it will be seen that neither of the stems of the respective valves 41—42 are in contact with the cam edges 39. In the off position, the actuator plate is disposed substantially horizontally. However, by depressing the handle 12 straight down as shown by the dot dash lines in Figure 1, the actuator plate is tipped so that both valve stems are contacted by the respective cam edges and consequently both valves are opened an equal amount. This relationship is shown in Figure 8. If however, at the same time that the lever is depressed, it is swung to the right slightly, as shown in Figure 9, the cold water valve 42 is opened more than the hot water valve. If the handle is swung all to the right, the cold water valve 42 is opened completely and the other valve being free of a cam edge 39 is permitted to close. This relationship is shown in Figure 10. In this position the opened valve 42 has its stem engaged in a pocket 56 at the inner end of the cam edge 39 where the wing meets the central portion of the actuator. The pocket should be positioned, of course, so that the opposite cam edge is entirely clear of the stem at its side before the pocket engages its stem. Referring again to Figure 5, it will be seen that when the actuator plate is turned in the horizontal plane only one of the valve stems can be contacted by a cam edge. In order to open both valves at once, it is necessary that the cam plate be tilted as explained above.

No matter whether the actuator plate 35 is being tilted or being turned in the horizontal plane without tilting, the cam edges 39 engage the valve stems so as to push them substantially at right angles to the axes of the valves. The force, in order to tip the valves and open them against the pressure of the water in the supply lines, is comparatively small. This is a result of the advantageous leverage of the comparatively long moment arm of valve stems over the comparatively short moment arm at valve discs. Or looking at it the other way around, little of the force or pressure of the water acting upon the valve discs is transmitted to the actuator plate since such force must act through the described leverage system in the opposite direction. This means that little force is required to maintain the handle in a set position. In the preferred embodiment this frictional force is obtained at the packing gland constituted by cap 28, washer 26 and seal ring 22.

Figure 11:
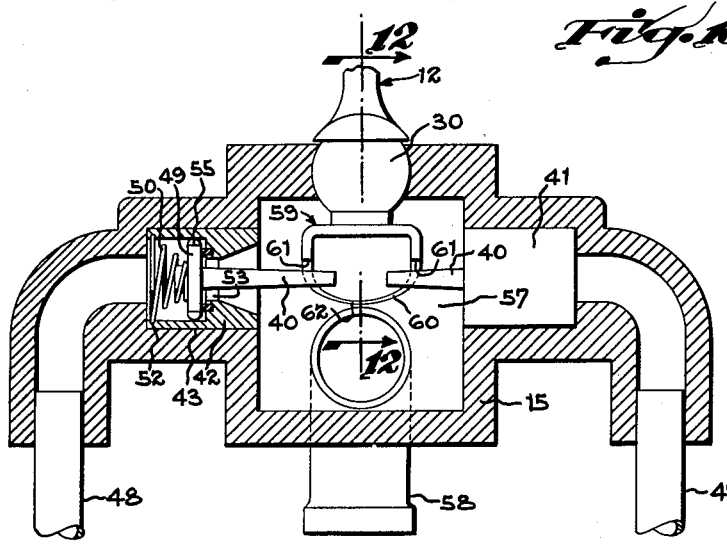
Figure 11 is a diagrammatic cross sectional view illustrating a modified form of the invention, in which the valves are arranged horizontally instead of vertically as shown in Figures 1–10.
Figure 12:
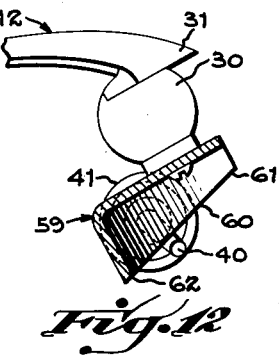
Figure 12 is a fragmentary cross sectional view taken on the line 12—12 of Figure 11.

In diagrammatic Figures 11 and 12 a slightly modified form of the invention is shown in which the two valves 41 and 42 are arranged horizontally. In this instance the valve stems 40—40 extend toward one another into a mixing chamber 57. The respective valves are seated within aligned bores extending horizontally outwardly from opposite sides of the mixing chamber 57 on a common axis. As in the preferred embodiment, the respective water supply lines 47—48 are in communication with the two bores with the pressure in the respective lines tending to close the valves. The cross section of Figure 11 is looking from the back toward the front of the faucet with a spout being shown at 58. The valve actuator in this instance is indicated at 59 and is bolted to a ball pivot 30 as in the preferred embodiment. Actuator 59 is in the shape of an inverted cup having a semicircular rim 60 which is in a plane slanting upwardly toward the rear of the faucet when the actuator is in the off position. The rim 60 thus constitutes a downwardly facing cam surface having two high points 61—61 and a low point or lobe 62, the low point being centered with respect to the high points and at the front of the actuator. The major portion of the actuator is forward of the center of the ball pivot and is centered between the two valves, above them, where the cam surface can act upon both valve stems. In off position the high points 61—61 are above the respective stems. However if the faucet handle is turned horizontally the valve at the side in which the handle is moving is opened progressively as lobe 62 revolves toward its stem. The same is true when the handle is swung in the other direction. If the handle is swung straight down from the center position, as indicated in Figure 12, both valves are opened, and if turned when in the down position, one stem is upset more than the other as the lobe 62 moves toward that stem. Thus, the essential operating characteristics of the embodiment shown in Figures 1–10 are maintained in the modified form. The valve stems are aligned with the flow of water into the mixing chamber, each stem is tilted to open its valve by being cammed off the axis of the valve, and the handle movement is the same in both embodiments. The details of construction of the packing gland in the modified form have been omitted, however, it will be understood that they are substantially the same as in the preferred embodiment. Also the swing spout is not shown in the modified form, but it is believed to be within the skill of the art to incorporate one in the lower portion of the faucet. Similarly, it is believed to be within the skill of the art to make appropriate threaded connections within the body of the faucet to accommodate the insertion of the valves and other parts.

Having described my invention, I claim:

1. A water faucet of the type having a single handle for controlling the flow of hot and cold water, said faucet comprising a housing having a chamber therein, a discharge spout leading from said chamber, respective hot and cold water supply lines leading into the bottom of said housing in spaced relationship, a pair of valves, said valves seated in the floor of said chamber and disposed between the chamber and the respective hot and cold water supply lines, said valves arranged to be closed by water pressure in said lines, an elongated stem extending upwardly from each of the valves into said chamber, said valves being arranged to open upon the tipping of their respective stems, an actuator plate disposed above the valves and centered with respect to their stems, said actuator plate operable by said handle and having outwardly extending arms thereon arranged to engage the sides of the respective valve stems on portions of the periphery of said stems remote from the center of said actuator to tip both stems upon movement of the handle in one direction and tip said stems independently of one another upon movement of the handle in a direction at right angles to the first direction.

2. A water faucet of the type having a single handle for controlling the flow of hot and cold water, said faucet comprising a housing having a chamber therein, a pair of cylindrical valve units mounted in the floor of said chamber, each of said valve units having an elongated stem extending axially therefrom, said valves being arranged to open upon tipping of their respective stems, and an actuator plate within said chamber movable by said handle and arranged to engage the sides of the respective valve stems for tipping the valve stems simultaneously and one independently of the other upon movement of the handle vertically and horizontally respectively said handle and said actuator plate having sufficient friction associated therewith to hold the valve stems against the water pressure in any position in which the stems are disposed by movement of said handle.

3. A water faucet of the type having a single handle for controlling the flow of hot and cold water, said faucet comprising a housing having a chamber therein, a discharge spout leading from said chamber, a pair of valve units, each unit of the pair being seated within the floor of said chamber with one end thereof open to said chamber, respective hot and cold water supply lines opening into the opposite ends of the respective valve units, a valve in each unit arranged to be closed by water pressure in the supply lines, an elongated valve stem extending axially upwardly from each of the valve units into said chamber, each valve unit being arranged to open upon the tipping of its stem, an actuator disposed in said chamber and operable by movement of said handle, and said actuator having cam surfaces associated therewith arranged to contact the sides of said stems simultaneously upon movement of the handle in one direction for tipping both stems and contact the respective sides of the stems independently of one another upon movement of the handle in directions at right angles to the first direction for tipping said stems independently of one another.

References Cited in the file of this patent

UNITED STATES PATENTS

| 963,221 | Haynes | July 5, 1910 |
| 989,175 | Moeller | Apr. 11, 1914 |
| 2,089,977 | Marchant | Aug. 17, 1937 |
| 2,106,929 | McClure | Feb. 1, 1938 |
| 2,559,046 | Peters et al. | July 3, 1951 |
| 2,578,362 | Kluver | Dec. 11, 1951 |